United States Patent [19]

Bryer

[11] 4,399,477
[45] Aug. 16, 1983

[54] SPLIT BAND ACTUATOR

[76] Inventor: Philip Bryer, 4271 Chaumond Rd., Woodland Hills, Calif. 91364

[21] Appl. No.: 212,985

[22] Filed: Dec. 4, 1980

[51] Int. Cl.³ .................. G11B 5/56; G11B 25/04
[52] U.S. Cl. .................................. 360/106; 369/41; 369/215
[58] Field of Search .................. 369/33, 41, 215, 216, 369/217, 219, 220, 221, 224; 360/106

[56] References Cited
U.S. PATENT DOCUMENTS 3,881,189  4/1975  Mayeda .................. 360/106
3,881,369  5/1975  Looney .................. 353/27 R Primary Examiner—Steven L. Stephan
Attorney, Agent, or Firm—Ralf H. Siegemund

[57] ABSTRACT

A stepper-motor-driven capstan is connected to a split band whose two portions loop around two idlers disposed on a displacement member and in line with the displacement and are doubled back to be affixed to another stepping device, such as multi-position armature devices or another step-motor-driven capstan. This arrangement permits interspersing of steps in order to reduce the actuator step length for a given stepping angle of the motor or motors, for increasing, for example, track density on a disk cooperating with a transducer on the displacement member.

14 Claims, 4 Drawing Figures

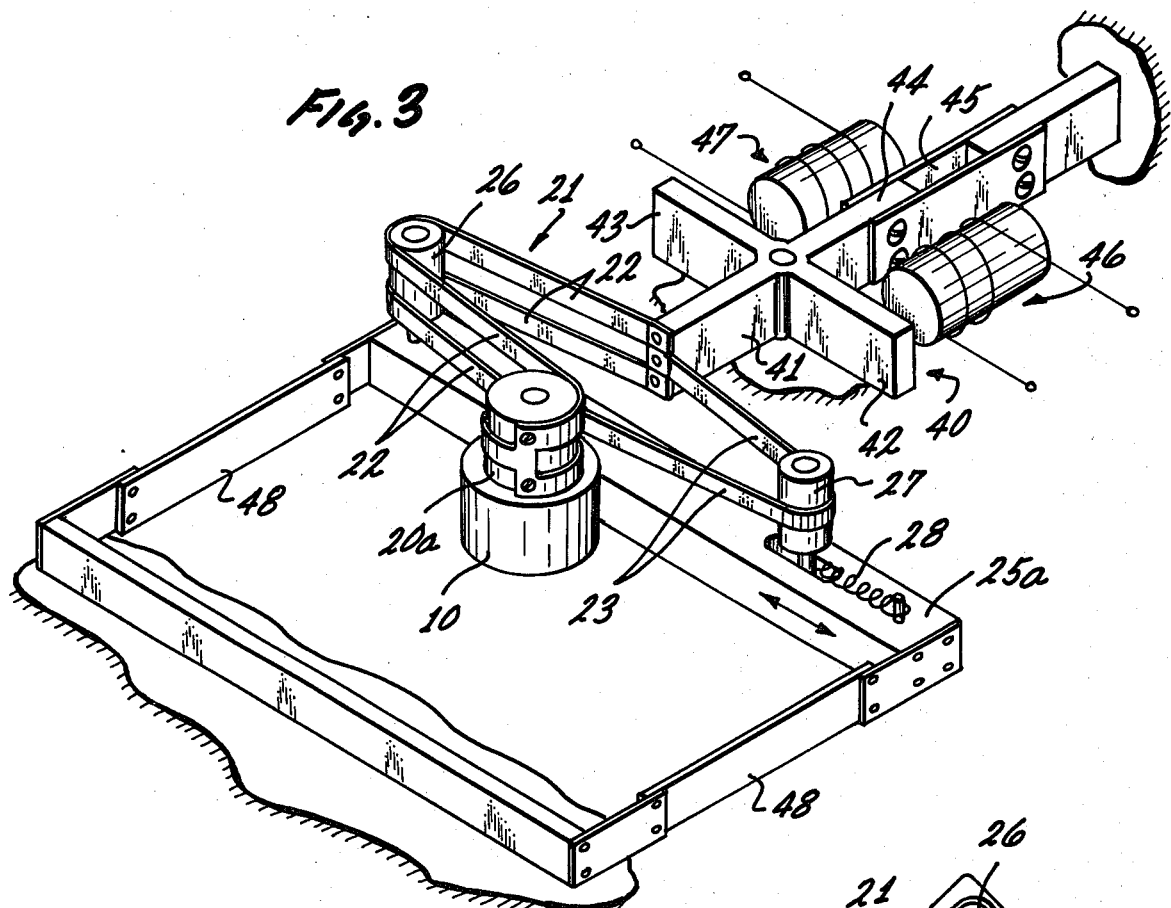
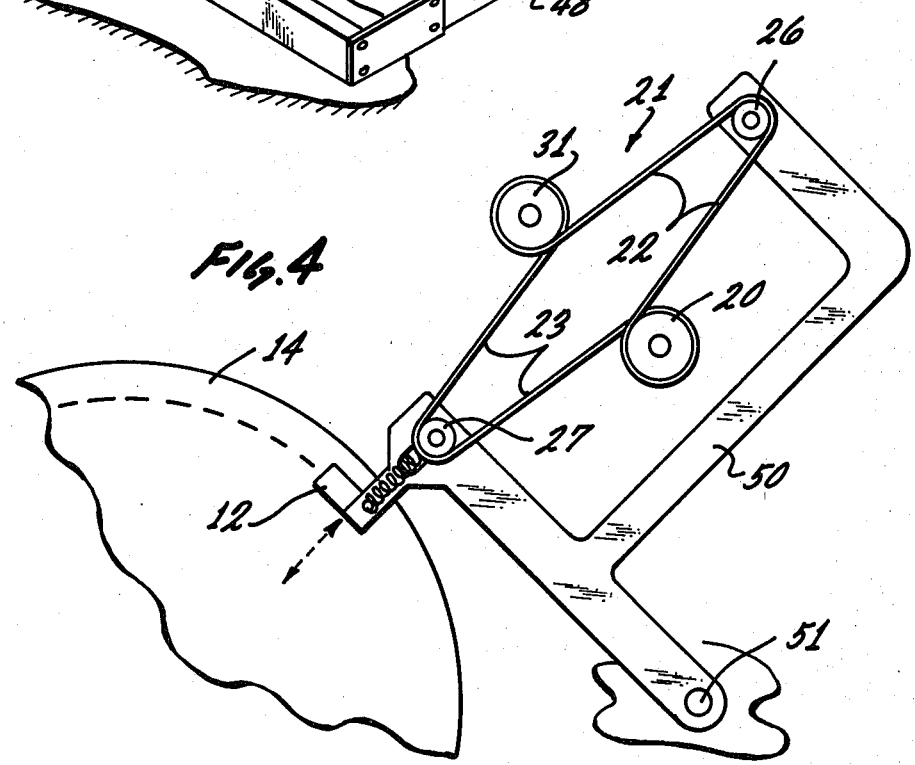

SPLIT BAND ACTUATOR

BACKGROUND OF THE INVENTION

The present invention relates to a positioning device for an actuator; and more particularly but not exclusively to positioning a transducer in relation to a magnetic recording disk.

The art of magnetic disk recording is well established. These disks are used in computer technology and serve as rapid access memory extensions. A disk unit, sometimes called a disk drive, is comprised of one or more coaxial disks, each having one or two magnetic surfaces for recording data in concentric tracks. When more than one surface is involved, one also speaks of concentric cylinders, the center of a track being the geometric line of intersection of a plane (the recording surface) with a cylinder. Each surface cooperates with one particular transducer to be positioned above any of the tracks/cylinders. The disk or disks spin as the transducer remains stationary for recording data on or recording data from the particular track. A track change requires the transducer to be moved radially in respect to the spin axis by means of an actuator. The present invention relates particularly to such an actuator.

Such actuators and transducer positioners are varied in design and performance, and cost tradeoffs usually determine their choice in any particular instance. One type of actuators is called "a voice coil motor." More recently, a stepper motor has been employed having a capstan to which is connected a split band having two ends which are fastened to a carriage member for the transducer. This device translates the rotational motion of the motor into a linear one. The band is tensioned so that any rotational step of the motor, regardless of direction, is translated into an incremental, linear motion of the transducer-carrying member. This type of drive has been used successfully; and the present invention is directed towards improvements thereof, bearing in mind that the principle involved, namely, translating rotational steps into linear displacement and positioning steps, can be applied also in other fields.

The presently used split-band-positioning devices have certain limitations. First of all, it is inherent that the capstan cannot rotate by more than 360°, i.e., it cannot make a full turn. For practical purposes, the angular range is limited to about 300°. The stepping motors themselves are limited to a certain angle per step, this being today about 1.8° per step for a total of about 167 steps. This means, such a positioning device can access at the most about 167 cylinders or tracks. This number presents a severe limitation. Moreover, the linear displacement per step is directly related to the diameter of the capstan. A 1.8° angular step will result in a particular, linear displacement for a given capstan diameter. That linear displacement step is directly equal to the maximum possible radial distance between adjacent tracks on the recording disk. Thus, if track density is to increased (a modern trend), the capstan diameter must decrease. That diameter determines directly the looping diameter for the split band; if it is too small, severe stress problems arise.

DESCRIPTION OF THE INVENTION

It is an object of the present invention to improve split-band-type positioners which are free from the limitations outlined above.

It is, therefore, an object of the present invention to improve such positioners, permitting an increase in the number of different positioning steps for a given stepping motor;

It is a related object of the present invention to permit a decrease in the linear, incremental displacement value per step as attainable by means of a split drive of a given capstan/motor combination.

It is, therefore, a specific object of the present invention to provide a new and improved split band positioner which includes a stepping motor and a capstan to which a split band is affixed, for purposes of providing linear (or arcuate) motion upon an actuator member such as a transducer carriage, displaceable holder, or the like.

In accordance with the preferred embodiment of the present invention, it is suggested to loop two ends of a split band as affixed to a step-motor-driven capstan, about two stationary elements, such as idlers or pulleys, being disposed on the member to be displaced as per the specific object; and to fasten the two ends of these bands to another stepping device which provides for supplemental displacement of these ends. This way, one can at least double the number of steps that would be attainable by the stepping motor otherwise.

In one form of practicing the invention, one uses two stepping motors with capstan in a symmetrical configuration operating, in fact, in a differential mode. In another version, one affixes the two ends of the split band to a positioning arm for purposes of providing interpolated or interspersed positions. The member displaced by the device may be so displaced in a strict linear fashion, or along an arc.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 3 is a perspective view of a second example for a higher step density device; and FIG. 4 is a plan view of a modified displacement member with actuator as per FIG. 1.

Proceeding now to the detailed description of the drawings, FIG. 1 illustrates a Stepper motor 10 of conventional design being under control of a drive and control circuit 11 which receives and/or provides operational commands in order to cause the motor 10 to rotate by one or more steps, the number being accurately predetermined by and in Circuit 11. The purpose is to position a transducer 12, for example, in relation to a spinning magnetic disk 14 being driven by a motor 15. In any particular position, transducer 12 will read from or record data on the disk and in one particular track, such as track 13. The motor 10 provides the requisite motion to reposition the transducer 12 for cooperation with another track. The device to be described next translates the rotational motion of motor 10 into a linear displacement motion of the transducer.

Figure 1:
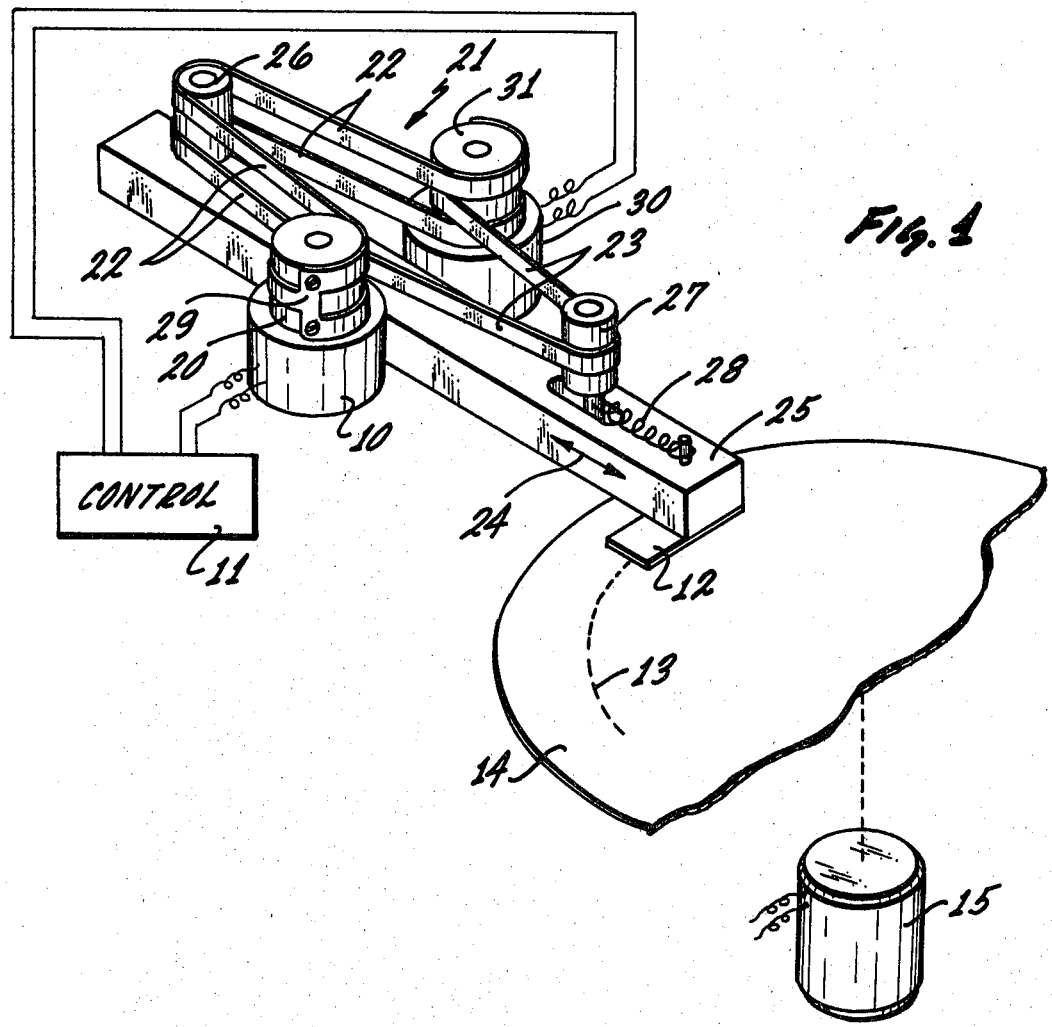
FIG. 1 is a perspective view of a first example of the preferred embodiment of the present invention for practicing the best mode thereof in a high-speed positioner.

Motor 10 drives a capstan 20 to which is affixed the center of a split band 21. This band has, therefore, two portions: a double-band portion 22, and a single-band portion 23 for reasons of symmetry as far as the forces acting between the band, the capstan, and further equipment is concerned.

The transducer 12 is mounted on a carriage or linear displacement member 25, there being suitable conventional bearings for frictionless displacement in direction of the arrow 24. Member 25 carries a first journal roller or idler 26 mounted for journaling on a fixed axis. Band portion 22 loops around that idler 26 in an, approximately, 180-degree turn.

A second journal roller or idler 27 is journaled on a shaft which permits longitudinal displacement on the member 25, in the direction of arrow 24. This idler is spring-biased by means of a spring 28. Single-band portion 23 loops around the idler 27 and spring 28 tensions the bands as a whole. The two rollers 26 and 27 are clearly the preferred form of providing band looping because there should be no sliding friction. This, however, is not essential in principle, any smooth post could provide the same function.

The other ends of the bands are affixed to a second capstan, 31, being driven by a stepping motor 30. It is preferred, though not essential, to provide the arrangement in strict symmetry. Thus, motors 10 and 30 are of identical design, function, and operation; and capstans 20 and 31 are likewise similar, particularly as to their diameters. Circuit 11 controls also the second capstan motor 30. The control may be such that circuit 11 issues alternating stepping commands to the two motors so that each one is operated at its maximum rate; but the commands are interspaced so that the stepping rate is, in effect, doubled.

Aside from the speed increase, one can readily see that each step undertaken by one motor and for a given stepping angle produces half the incremental, linear displacement of member 25. As to each motor and capstan individually, the total range of possible displacement for member 25 is thus halved; but since there are two motors and capstans, the full displacement range (300° times the capstan diameter) is available. In effect, the number of different positions in that range has now been doubled, which means that the track density is doubled. Access time has been (almost) halved on the average.

To state it in analytical form: if motor 30 remains stationary, the linear displacement provided by capstan 20 for each angular step of motor 10 (1.8°) is $d \times 1.8$, whereby "d" is the diameter of capstan 20. This linear displacement is translated into a value of $d \times 0.9$ displacement of member 25, i.e., the step length is halved. The total displacement range of the capstan, $300 \times d$, is likewise halved, but the same consideration is true for motor 30 with motor 10 remaining stationary. Thus, the full range is restored at twice the number of steps so that the track spacing on disk 14 can be halved, which doubles the track density.

As far as band 21 is concerned, it is advisable to make a single band from one and the same sheet of spring steel for reasons of ensuring identical modules of elasticity. One capstan will be secured to the common portion (29), while the other capstan is connected to the ends. It is not important to which capstan one connects the ends. Also, two separate spring assemblies could be used for the two branches; but for reasons shown above, this is not preferred. In any event, spring ends would then be connected to each of the two capstans.

In the example given above, total track space remained as is; but track density was increased (doubled) by permitting an additional track between any two, this comparison being made with a conventional split band drive having a particular stepping motor and a particular capstan. A conceivable modification here is the following. One provides the capstans with different diameters. If capstan 20 has twice the diameter of capstan 30, then the steps and total range attainable by capstan and motor 10 alone is the same as in a conventional split band drive. The second capstan, 30, will now provide, so to speak interpose, half steps; but additionally, the total displacement range is enlarged by 50 percent.

Figure 2:
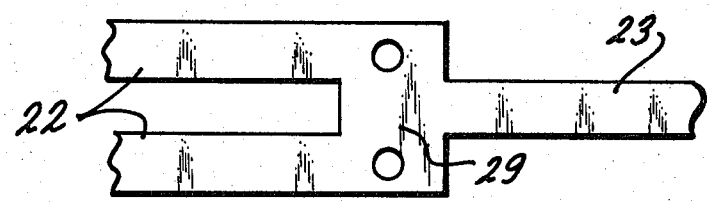
FIG. 2 is a plain view of a portion of the spring being employed.

A more simplified version is shown in FIG. 3. If we assume the same total displacement range, then the device shown in FIG. 2 requires again a capstan (20a) of twice the diameter as capstan 20. Motor 10 is the same as before; so are idlers 26 and 27, and the biasing spring 28 provides the same band-tensioning function. The ends of bands 22 and 23 are affixed here to the one arm 41 of a pivot member 40 having a cross-like plan view configuration. Lateral arms 42 and 43 are armatures for cooperation with two electromagnets 46 and 47. A resilient bias element 45 acts on the fourth arm 44 in order to center the pivot member 40 in a particular, symmetrical position as far as arm 41 in relation to capstan 20a is concerned.

It should be mentioned also here that the term "band ends" is a relative one; the central portion 29 could be affixed to arm 41 and the ends affixed to the capstan 20a. Moreover, the junction area 29 could also be interpreted as band ends, just being integrally joined in this instance at that point.

The centered position of pivot member 40 is maintained when the electromagnets 46 and 47 are not energized. Energizing one or the other pivots member 40 in one or the other direction. The dimensions are so chosen that the pivoting of member 40 (for stationary stepper 10) displaces member 25a in one or the opposite direction and by a displacement increment that is one-third of the step length obtainable by motor 10. This then amounts to a tripling of the position and track density. However, the track-changing time is less than in the example of FIG. 1.

The device as per FIG. 3 could be simplified in that the centering position is eliminated and one or the other electromagnet is always energized. One would obtain just a two-position device, doubling the number of steps. The same result would be obtained if just one magnet were provided, while spring bias moves the pivot member into the alternate position. Conversely, one could add further positions, e.g., through electromagnetically retractable stop members.

This example demonstrates another feature of the inventive arrangement. Generally, track density is also limited in part by thermal expansion of various elements in the drive. This can be compensated by the choice of materials and dimensions of arm 41 and of the split band. The thermal coefficients of expansion may permit a change in the effective dimensions of the split band as acting upon member 25a in order to provide for the requisite thermal compensation of the positioning of the transducer carried by member 25a.

FIG. 3 illustrates another modification as compared to FIG. 1, but that modification is also applicable to the structure shown in FIG. 1. The displacement member 25a is suspended here by means of flexure members 48.

FIG. 4 illustrates somewhat schematically application of the drive for operating a pivot arm 50, pivoting on a pivot 51 in order to move the transducer along an arc or arcuate path rather than straight linearly.

The different structures for the displacement member and for its guidance and support are shown here by way of example only in order to show that the invention is applicable to different types of displacements. In some of these cases (except FIG. 1), the displacement is not along a fixed line vis-à-vis the capstans or pivot member 40; but there are components of motion toward or away from them. This is permissible on account of the flexibility of the bands. The slight irregularity in linear displacement values per step creates clearly a higher-order effect only and is, therefore, negligible.

The invention is not limited to the embodiments described above; but all changes and modifications thereof, not constituting departures from the spirit and scope of the invention, are intended to be included.

I claim:

1. An actuator and positioning device of the split-band variety, for positioning an actuator member, there being a stepping motor driving a capstan in steps, the split band being affixed to the capstan, extending therefrom and having two band portions with ends, the improvement comprising:
   first and second means on the member around which the two band portions are respectively looped:
   a stepping device to which both of the said ends are affixed, the stepping device longitudinally displacing the ends in opposite directions; and
   control means for the stepping device, operating the stepping device in steps so that for each position of the member as provided by the step position of said motor, there is at least one additional position of the member not attainable by a change in step position of the said motor.

2. Device as in claim 1, the first and second means being journaled idlers.

3. Device as in claim 1 or 2, one of the first and second means being spring-biased for tensioning the split band.

4. Device as in claim 1, the stepping device being another stepping motor driving another capstan, the ends being affixed to the capstan.

5. An actuator as in claim 1, said ends being integrally joined.

6. An actuator and positioning device for a displacement member, comprising:

a first and a second stepping device disposed on opposite sides of the member;
first and second loop means on the member and being aligned along an axis; and
first and second band means, the first band means interconnecting the first and second stepping devices and looping around the first loop means with one continuous loop, the second band means interconnecting the first and second stepping device and looping around the second loop means with one continuous loop so that the member assumes stepped positions larger in number than the number of step positions of each of the first and second stepping device.

7. Device as in claim 1 or 6, the member carrying a transducer for positioning in relation to a magnetic disk surface.

8. A device as in claim 6, at least one of the stepping devices being a stepping motor with a capstan to which the band means are affixed.

9. A device as in claim 6, said stepping devices being stepping motors with capstans to which the band means are affixed.

10. An actuator as in claim 4 or 9, said capstan having similar diameters, the stepping motors providing similar step lengths.

11. An actuator as in claim 10, including control means for alternatingly operating the motors.

12. An actuator as in claim 10, wherein the first and second band means constitute an integral split band, different portions of which establish the first and second band means.

13. An actuator and positioning device of the split band variety for positioning an actuator member, comprising:
   a stepper motor;
   a capstan driven by the stepper motor;
   a stepping device;
   first and second looping means of the member and arranged in line with desired displacement; and
   a split band, a first portion interconnecting the capstan and the stepping device via a continuous loop looping around the first looping means, a second portion interconnecting the capstan and the stepping device via a continuous loop looping around the second looping means.

14. An actuator as in claim 1, 8, or 13, the stepping device, or one of the stepping devices, being an electromagnetically operated device for displacing the ends by fixed increments in order to obtain additional, interspersed positions of the actuator member, interspersed between two respective positions attainable by one step of the stepper motor.

* * * * *